Feb. 27, 1973 O. A. WILLIAMS JR., ET AL 3,718,813
TECHNIQUE FOR CORRELATION METHOD OF DETERMINING
SYSTEM IMPULSE RESPONSE
Filed Jan. 19, 1972
8 Sheets-Sheet 1

INVENTORS
OLIN A. WILLIAMS, JR.
JOHN B. PEATMAN
BY
ATTORNEYS

(A) SEQUENCE

(B) WAVEFORM (C) AUTOCORRELATION

WORD PAIR FORMAT

RECIRCULATING LOOP FORMAT

Fig-5

CRYSTAL CLOCK OSCILLATOR WAVEFORMS

United States Patent Office 3,718,813
Patented Feb. 27, 1973

3,718,813
TECHNIQUE FOR CORRELATION METHOD OF DETERMINING SYSTEM IMPULSE RESPONSE
Olin A. Williams, Jr., 4480 Lashaly Drive, Tucker, Ga. 30084, and John B. Peatman, Georgia Tech, Atlanta, Ga. 30302
Continuation-in-part of abandoned application Ser. No. 47,502, June 18, 1970. This application Jan. 19, 1972, Ser. No. 218,981
Int. Cl. G06f 7/19; G01r 27/28
U.S. Cl. 235—181
9 Claims

ABSTRACT OF THE DISCLOSURE

Improved method for making real time system impulse response measurements which involves the use of binary pseudo-random noise sequences as test signals.

---

The invention described herein may be manufactured, used, and licensed by or for the Government for governmental purposes without payment to us of any royalty thereon.

CROSS-REFERENCE TO RELATED APPLICATIONS

This application is a continuation-in-part of our parent application, Ser. No. 47,502, filed on June 18, 1970, now abandoned, relating to Technique for Correlation Method of Determining System Impulse Response.

BACKGROUND OF THE INVENTION

(1) Field of the invention

By using a new technique with an old method real time system, impulse response measurements may be made with relative ease. This is accomplished without adversely affecting the normal operation of the system. Since the impulse response of a linear system completely describes its dynamic characteristics the practical use of such information is virtually unlimited. In control systems, for example, such characteristics as overall gain, step response overshoot and rise time are directly obtainable from the impulse response. An on line impulse response calculator can therefore be used to monitor these and many other system parameters in adaptive control systems. Areas of application to advanced maintainability support systems include on-line performance testing, early warning fault detection and fault isolation.

By using the new technique, as set forth in our invention, the crosscorrelation method for on-line system impulse response measurements can be implemented digitally with relative ease. This is accomplished in most cases without adversely affecting the normal operation of the system. Application of the method is not complicated in that the process consists of appropriately adding or subtracting sampled system output values based on an extremely simplified crosscorrelation algorithm. This is primarily due to the use of binary pseudo-random noise sequences rather than the truly random noise test signal required by the crosscorrelation method. Pseudo-random binary noise sequences exhibit the required randomness properties while being absolutely deterministic. It is this deterministic nature that leads to the simplified crosscorrelation algorithm and hence the impulse response calculation.

The basic crosscorrelation method may be best illustrated by considering the following casual time-invariant linear system with impulse response $h(t)$:

$$f_i(t) \longrightarrow \boxed{h(t)} \longrightarrow f_o(t)$$

The relationship between the input $f_i(t)$ and the output $f_o(t)$ of the system is given by the superposition or convolution integral:

$$f_o(t) = \int_0^\infty h(t) f_i(t-x) dx$$

It can be shown that the crosscorrelation of the input and the output, $\psi_{io}(\lambda)$, can be written as $$\Psi_{io}(\lambda) = \int_0^\infty h(x) \Psi_{ii}(\lambda - x) dx$$

where $\psi_{ii}(\lambda)$ is the autocorrelation of the input. A comparison of this equation with the previous one indicates that $\psi_{io}(\lambda)$ would be the output response of the system if the input were $\psi_{ii}(\lambda)$. If $\psi_{ii}(\lambda)$ is an impulse function, then $\psi_{io}(\lambda)$ will be the impulse response of the system.

To illustrate how the crosscorrelation method is applicable to on-line system identification, consider the system in which $f_i(t)$ is the normal system input and $n_i(t)$ is a suitable low level noise signal whose autocorrelation approximates an impulse function:

$$f_i(t) \underset{+\uparrow+}{\overset{\otimes}{\longrightarrow}} \overset{f_i(t)+n_i(t)}{\longrightarrow} \boxed{h(t)} \overset{y(t)=f_o(t)+n_o(t)}{\longrightarrow}$$
$$n_i(t)$$

If the noise test signal $n_i(t)$ and the output component due to the normal system input $f_o(t)$ are reasonably uncorrelated which is usually the case, then it can be shown that crosscorrelating the noise signal $n_i(t)$ with the total system output $y(t)$ is equivalent to crosscorrelating $n_i(t)$ and $n_o(t)$ thus yielding the impulse response $h(\lambda)$. So the fact that the system may be in normal operation has no effect in the crosscorrelation calculation of the impulse response. The magnitude of the noise test signal may be low level, possibly below the ambient noise level of the system, thus having as little affect on the normal system operation as possible.

(2) Description of the prior art

One important problem in the area of system modelling and identification is that of determining the dynamic characteristics of a given system while it is in operation. If the autocorrelation function of the input and output are known then the system function or impulse response can be found by a deconvolution process. By injecting specific test signals into the system along with the control signal and looking at the output, much information about the dynamic characteristics can be obtained.

Using various sinusoidal test signals with relatively small magnitudes, as compared to the control signal, and averaging the output over a suitable number of periods, the dynamic characteristics in the form of amplitude and phase information can be determined. A useful measure of the dynamic behavior of a system is its impulse response.

Since the impulse response of a linear system completely describes its dynamic characteristics, the practical use of such information is virtually unlimited. In order to determine the impulse response of a system a test signal consisting simply of a large impulse could be used. In such a case the normal output of the system would be disrupted for a large part of the duration of the impulse response.

There are many systems in which it is undesirable to interrupt the normal operation or to have the impulse response present at the output. Likewise, a system may not be able to withstand a large impulse. One solution to these problems is to apply small impulses as a test signal and average the output. In this way the impulse response can be obtained without drastically affecting the normal operation or output of the system. The time for obtaining the impulse response depends on the relative magnitudes of the test and control signals. For relatively small test impulses, or pulses of short duration with respect to the response time of the system, there will be a need to average more output samples in order to obtain useful results.

The impulse response of a linear system can also be determined while the system is in operation by using a crosscorrelation technique. This method consists of crosscorrelating an appropriate additive input test signal with the system output. This approach to impulse response determination requires a test signal with some special characteristics. One such class of signals are the binary pseudo-random noise sequences. These are periodic sequences which are generated from shift registers with logical feedback. The impulse response of the system under test is determined by crosscorrelating the input noise test signal with the system output. A unique property of this method is that the resulting crosscorrelation calculation is unaffected by the normal operation of the system. Thus, by using a low level noise test signal the impulse response may be calculated "on line." Previously used techniques of system identification such as step, impulse, or sine-wave testing all have serious limitations. Using a random or pseudo-random noise input and correlation techniques, the basic limitations can be overcome. The advantages of using correlation identification techniques are numerous. Thus, the system or plant need not be closed down for testing; test signals can be relatively small and they need not interfere with normal operation; results may be obtained in the presence of outside noise and parameter drifts; if a random or pseudo-random binary sequence is used as the input signal, it can be reproduced easily by a transducer.

One prior art technique for correlation identification is the single point technique. This involves the calculation of one point at a time of the crosscorrelation function which is a time consuming process. Yet another technique, in which a fixed number of values of the crosscorrelation function are calculated simultaneously, involves sampling and storing of the input noise test signal, performance of multiplication, and averaging out processes.

None of the prior art techniques for implementing the crosscorrelation approach take full advantage of the use of pseudo-random test signals in the crosscorrelation calculation. Pseudo-random noise sequences have been used as test signals for the crosscorrelation approach but the simplified algorithm for the crosscorrelation calculation, which is presented here, has not been used previously.

Although the binary pseudo-random noise sequences exhibit the required randomness properties they are absolutely deterministic. It is primarily this deterministic nature that leads to an extremely simplified crosscorrelation algorithm and hence the impulse response calculation.

SUMMARY OF THE INVENTION

Using a crosscorrelation technique the impulse response of a system can be determined in one impulse response time of the system that is under test. This method consists of crosscorrelating an appropriate input test signal with the system output to obtain the impulse response. The test signal, which is added to the normal input of the system, can be any low level random signal with an autocorrelation function that approximates an impulse function.

It is an object of our invention to demonstrate the effectiveness of digital methods in obtaining a measurement of the dynamic characteristics, in the form of the impulse response, of a system using a pseudo-random noise test signal and the correlation technique.

Binary sequences of ONE's and ZERO's can easily be generated through the use of a shift register and feedback logic. Output sequences of such a device are periodic with period "$p$" not exceeding $2^n-1$ where $n$ is the number of storage positions in the shift register. Sequences with periods equal to $2^n-1$ are referred to as maximum length shift register sequences. They are all pseudo-random in the sense that they satisfy the following three randomness properties:

(1) The Balance Property.—In each period the number of ONE's differs from the number of ZERO's by at most 1.

(2) The Run Property.—Among the runs of ONE'S and of ZERO's in each period one-half the runs of each kind are of length one, one-fourth of each kind are length two, one-eighth are of length three, and so on as long as these fractions give meaningful number of runs.

(3) The Correlation Property.—If a period of the sequence is compared term by term with any cyclic shift of itself, the number of agreements differs from the number of disagreements by at most 1.

Figure 4:
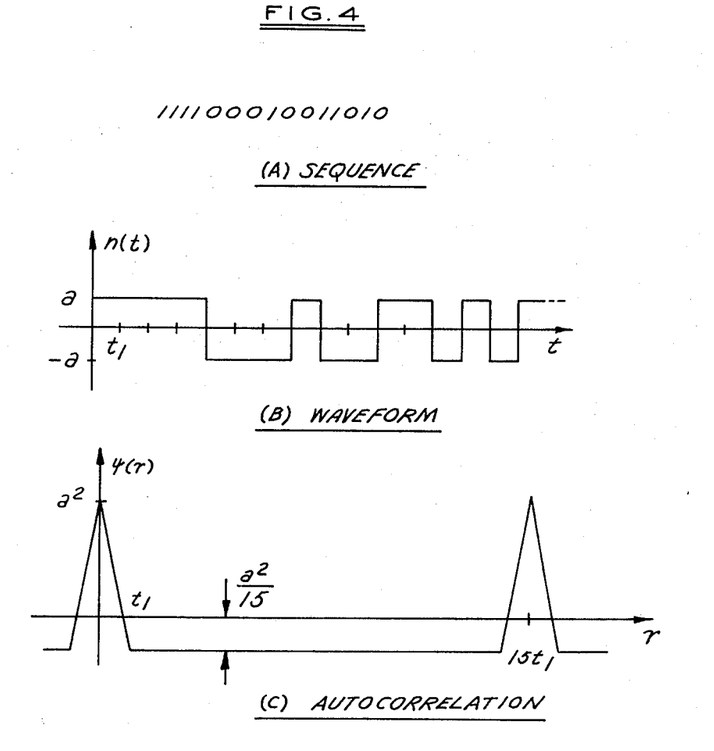
FIG. 4 is a diagram showing pseudo-random sequence, waveform and autocorrelation.

An example of such a sequence of length $2^4-1=15$, its corresponding waveform, and its periodic autocorrelation function is illustrated by FIG. 4. A ONE in the sequence corresponds to a waveform value of "$a$" for a period of time $t_1$. Similarly a ZERO in the sequence corresponds to a value of "$-a$".

By decreasing the time interval $t_1$ the autocorrelation can be made to more closely approximate a series of periodic impulses. For use as a noise test signal for the crosscorrelation method the time interval between these periodic impulse approximation $(2^n-1)t$, must be greater than the impulse response time of the system. That is, the time it takes the impulse response to effectively die out.

Hardware has been developed which can simultaneously compute a relatively large number of crosscorrelation values for two input signals. This method can be used in conjunction with the crosscorrelation method of determining system impulse responses and the test signal used may be a pseudo-random noise sequence. Our invention presents a novel method which involves a much simpler process due to the deterministic nature and excellent randomness properties of pseudo-random binary noise sequences around which this invention is based.

Because the simplified technique drastically reduces the task involved in implementing the correlation technique for impulse response determination, there is necessarily a reduction in size, weight, and cost of the associated hardware over that previously required to perform the task.

Other advantages of the present invention will become apparent to those of ordinary skill in the art by the following description when coincided in relation to the accompanying drawings.

DESCRIPTION OF THE PREFERRED EMBODIMENT

Figure 2:
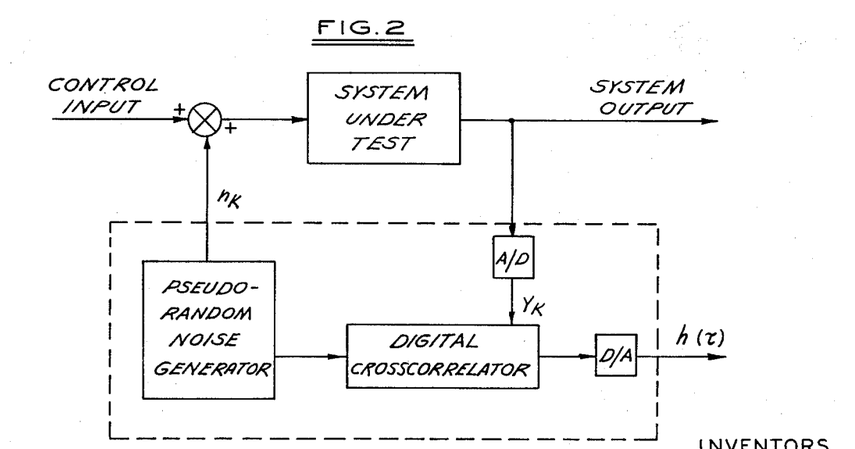
FIG. 2 is a diagram of an impulse calculator and test system.

In the illustrated embodiment of the invention, FIG. 2 shows values of a pseudo-random noise sequence $n_k$ which are generated and added to the test system's input. Output samples $y_k$ are made each time the binary input noise signal is updated. During each output sample period a portion of each point in the crosscorrelation waveform is calculated. To illustrate the algorithm involved the following example in which a binary pseudo-random noise sequence of length 7 is used as the test signal. The digital crosscorrelation can be expressed as:

$$\psi(kt_1) = \frac{1}{7t_1} \sum_{i=0}^{6} n_{i-k} y_i$$

where $k$ is a positive integer and $7t_1$ is the period of the noise sequence. Since the noise sequence is periodic a value of $n_j + 7r$ is equivalent to $n_j$ for $r$ equal any integer. The set consisting of 7 discrete points for the crosscorrelation waveform is then described by the following set of scaled crosscorrelation equations:

$$(7t_1)\psi(0) = n_0 y_0 + n_1 y_1 + n_2 y_2 + n_3 y_3 + n_4 y_4 + n_5 y_5 + n_6 y_6$$
$$(7t_1)\psi(t_1) = n_6 y_0 + n_0 y_1 + n_1 y_2 + n_2 y_3 + n_3 y_4 + n_4 y_5 + n_5 y_6$$
$$(7t_1)\psi(2t_1) = n_5 y_0 + n_6 y_1 + n_0 y_2 + n_1 y_3 + n_2 y_4 + n_3 y_5 + n_4 y_6$$
$$(7t_1)\psi(3t_1) = n_4 y_0 + n_5 y_1 + n_6 y_2 + n_0 y_3 + n_1 y_4 + n_2 y_5 + n_3 y_6$$
$$(7t_1)\psi(4t_1) = n_3 y_0 + n_4 y_1 + n_5 y_2 + n_6 y_3 + n_0 y_4 + n_1 y_5 + n_2 y_6$$
$$(7t_1)\psi(5t_1) = n_2 y_0 + n_3 y_1 + n_4 y_2 + n_5 y_3 + n_6 y_4 + n_0 y_5 + n_1 y_6$$
$$(7t_1)\psi(6t_1) = n_1 y_0 + n_2 y_1 + n_3 y_2 + n_4 y_3 + n_5 y_4 + n_6 y_5 + n_0 y_6$$

Knowing $y_0$ and the pseudo-random noise sequence one may calculate the first term in each of the sums. If the binary noise sequence is considered to have the values of $\pm 1$, then it is merely a matter of assigning the appropriate sign ($+$ or $-$) to the sampled output value $y_0$ in order to obtain the first term in such sum. Similarly, the second term in each sum will be the output sample $y_1$ with the appropriate sign as determined by the noise sequence. The process consists simply of sampling an output value and either adding or subtracting it to a number of accumulating totals whose ultimate sums will be discrete values of the scaled crosscorrelation function. Because of the simple manner in which the pseudo-random noise sequences may be generated, the technique of crosscorrelation can be easily implemented. As an example consider the case in which a noise sequence of length 7 is to be used. A much longer sequence will be necessary for most practical applications but the technique is the same in any case. Since the sequence is of length seven there will be seven points of the scaled crosscorrelation function generated.

Figure 1:
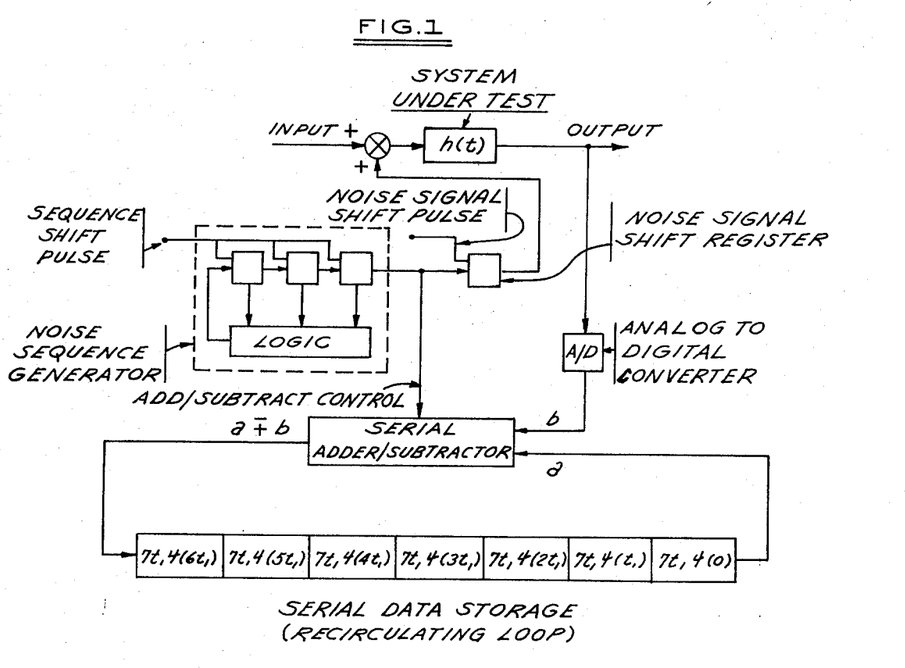
FIG. 1 is a diagram of the digital crosscorrelation implementation.

These values, as shown in FIG. 1, will be generated in the recirculating loop. As the process begins all values in the loop are zero. The first value of the noise $n_0$ is on the output of the one bit noise signal shift register and therefore to the input of the system under test. At the same time output sample $y_0$ is taken and converted from analog to digital form. Based on whether $n_0$ is $+1$ or $-1$ the sampled value $y_0$ is either serially added or subtracted from the initial zero value in the allotted space for $7t_1\psi(o)$ in the recirculating loop. At this time the sequence shift pulse shifts the noise value $n_6$ to the output of the sequence generator. The one bit noise signal shift register is not changed and the value of $n_0$ remains at the input of the system under test. The value $n_6$ will determine whether $y_0$ will be added or subtracted to the initial zero value in the $7t_1\psi(t_1)$ space of the recirculating loop. Next, the sequence shift pulse shifts the value $n_5$ to the output of the sequence generator and based on its value $y_0$ is either added or subtracted to the initial zero in the space for $7t_1\psi(2t_1)$. Similarly, $y_0$ is either added or subtracted to the initial zero of the remaining spaces. After $y_0$ has been either added or subtracted to the space for $7t_1\psi(6t_1)$ and $n_1$ is still on the output of the sequence generator, the noise signal shift pulse shifts the value of $n_1$ to the output of the one bit noise signal shift register to replace the value of $n_0$ which has remained there up until this point. At the same time a new test system output value $y_1$ is sampled and converted to digital form. At this time the value of $y_1$ is either added or subtracted, depending on the value of $n_1$, to the appropriately signed value of $y_0$ from the previous cycle. The process is continued in this manner until the sampled value of $y_6$ has been appropriately added or subtracted with the sum in the space for $7t_1\psi(6t_1)$. At this point the calculation of the crosscorrelation is complete.

Because the noise sequence was chosen to consist of $\pm 1$ values, a DC constant error term will be present. Since the approximation of the impulse response $h(t)$ can be written as:

$$h_k = 1/8 \left[ 7t_1 \psi(kt_1) + 7t_1 \sum_{i=0}^{6} \psi(it_1) \right]$$

the error term, $$7t_1 \sum_{i=0}^{6} \psi(it_1)$$

which is the sum of the seven crosscorrelation values, can be calculated by separately summing all forty-nine components involved in the calculation. This value can be subtracted from each of the seven values of $7t_1\psi(kt_1)$ to produce the end result of the seven values $8h_k$.

To illustrate the precise nature of signal processing, timing, and control sequencing of our invention, a prototype calculator was constructed and herein is described the technique which embodies our invention.

The prototype generates a pseudo-random noise signal to be added to the input of a test system and then to crosscorrelate the system output response with this noise signal. A six position shift register with mod 2 feedback is used to generate a pseudo-random noise signal. The period of this signal is $(2^6-1)t_1 = 63t_1$, where $t_1$ is the duration of the narrowest pulse. A scaling circuit is incorporated in the prototype to provide for several values of $t_1$ so that the impulse response can be spread out over one noise signal period. This enables the pulse width of the noise autocorrelation function to be as narrow as possible with respect to the impulse response. The crosscorrelation process is performed digitally in the prototype. The analog output of the test system is sampled and converted to a series of binary numbers. An eleven bit sign plus two's complement binary coding is used in the A/D (analog to digital) conversion and in the digital calculation of the crosscorrelation.

Figure 3:
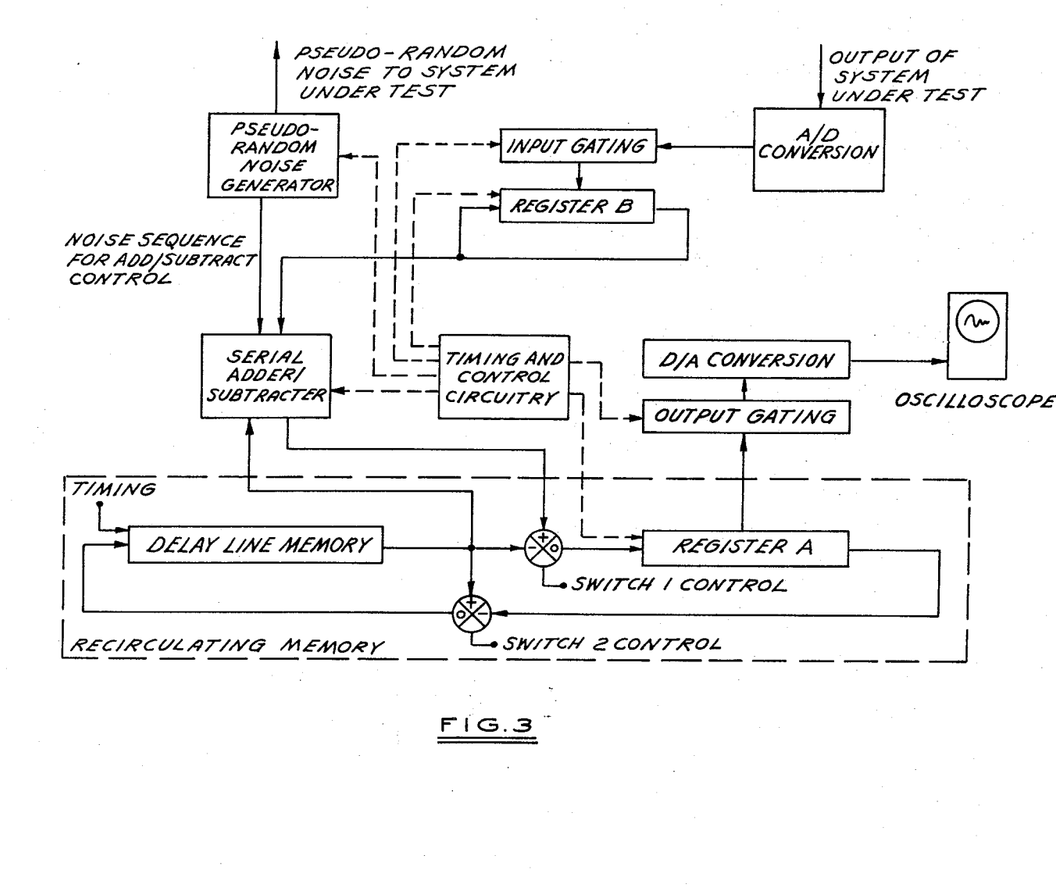
FIG. 3 is a block diagram of a prototype design embodying the present invention.
Figure 5:
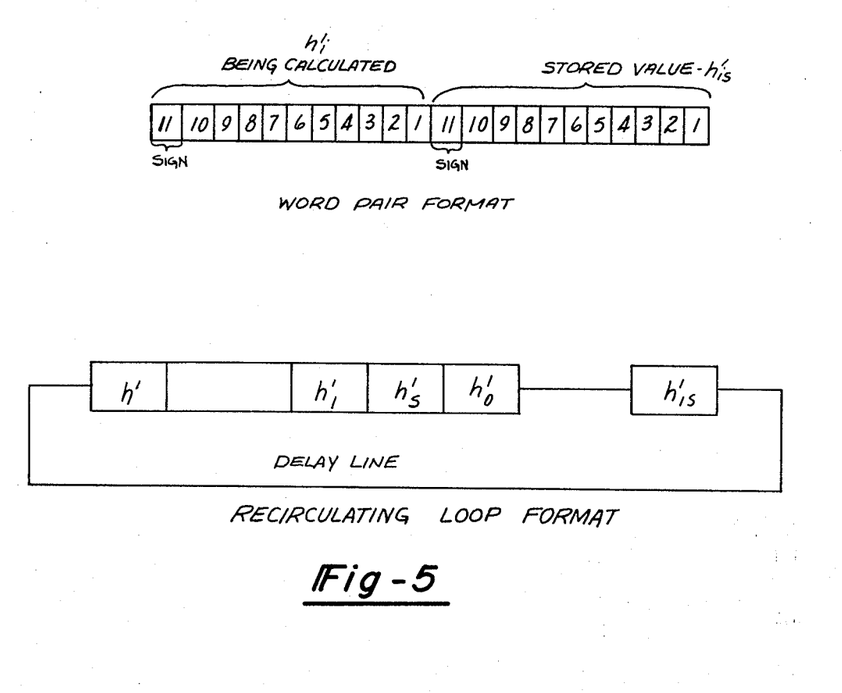
FIG. 5 is a block diagram of the binary 11 bit word pair format and the recirculating loop format of the prototype.

Data is calculated and stored in a recirculating loop memory which consists of a two millisecond delay line and an eleven bit shift register denoted by register A, as shown in FIG. 3 of our drawings. Information in the loop consists of 63 word pairs. A word pair is made up of two eleven bit binary numbers as is shown in FIG. 5 of the drawings. The rightmost number in the pair is a value of the previously calculated impulse response. It is stored in this position and displayed during the calculation process. This calculation process takes 63 recirculations of the loop data and is being carried out in the eleven bit words immediately preceding the stored words. During the 64th recirculation the newly calculated values are shifted forward to replace the stored values and calculation of a new set is begun once again.

An impulse response curve is traced on the oscilloscope screen once each recirculation. Each time a previously calculated and stored word is in register A its value is transferred through the output gating to the D/A converter. This value is held by the gating circuitry until the next stored word is in register A at which time the output to the oscilloscope is updated again.

For the calculation process the output value of the system under test is needed in digitally coded form. The input gating circuit samples the A/D conversion of this value once each recirculation and sets it into the eleven bit shift register B. These samples are the values of $y_0$, $y_1$, $y_2$ and so forth. Register B forms an eleven bit recirculating loop, wherein the values of $y$ are available in serial form one bit at a time and the least significant bit first. When the calculation process begins there is a value of zero set in the word space for each of the values of $h'$ to be calculated. On the first recirculation of the calculation process the first value of $y$, that is $y_0$, is added to or subtracted from the initial zero values of $h'$. This constitutes the first component of each of the values of $h'$ that are being calculated. The add or subtract control is determined by the values of the pseudo-random noise sequence. On the second recirculation the second component of the $h'$ values is added to the total by appropriately adding or subtracting $y_1$. The process is completed after the 63rd recirculation.

The purpose of switch control 1 in FIG. 3 is to allow the stored words to recirculate unaltered during the calculation process. When the switch is in the subtract (—) position a stored word passes from the delay line through the switch into register A. When switch 1 passes to the add (+) position a value of $y$ is appropriately combined in the adder/subtractor with a word from the delay line and this value passes through switch control 1 into register A. Switch control 2, normally in the subtract (—) position for the calculation and display mode, controls the shifting mode at the end of the calculating process. At the beginning of the shift mode switch 1 changes to the subtract (—) position and remains in this position for the entire recirculation. Switch 2 changes to the add (+) position for the first eleven bit word thus allowing the newly calculated $h_0'$ to bypass register A and enter the delay line in the position of the stored $h_{63}'$. The word in register A is set to zero and the switch changes to the subtract (—) position allowing the zero value to enter into the first calculation space. Switch 2 continues to alternate passing the newly calculated values of $h'$ and values of zero into the delay line for the remainder of the recirculation.

Figure 6:
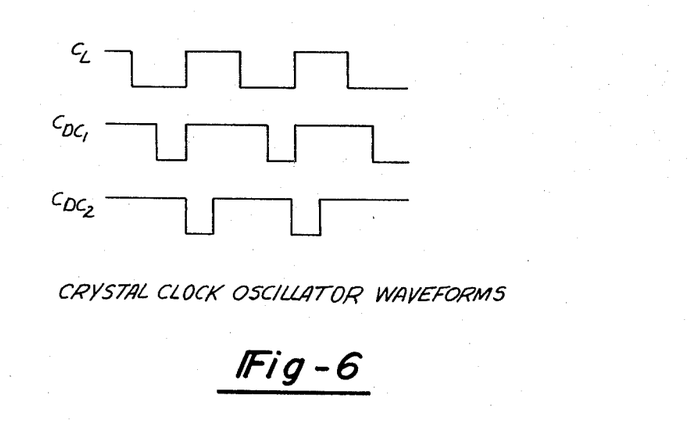
FIG. 6 is a diagram of the crystal clock oscillator waveforms which are used as the basis timing signals of the prototype.

A crystal controlled clock oscillator is used as the basic timing device. Two DC pulses are provided for DC setting during a clock period. The clock waveforms are indicated in FIG. 6 of our drawings.

Figure 7:
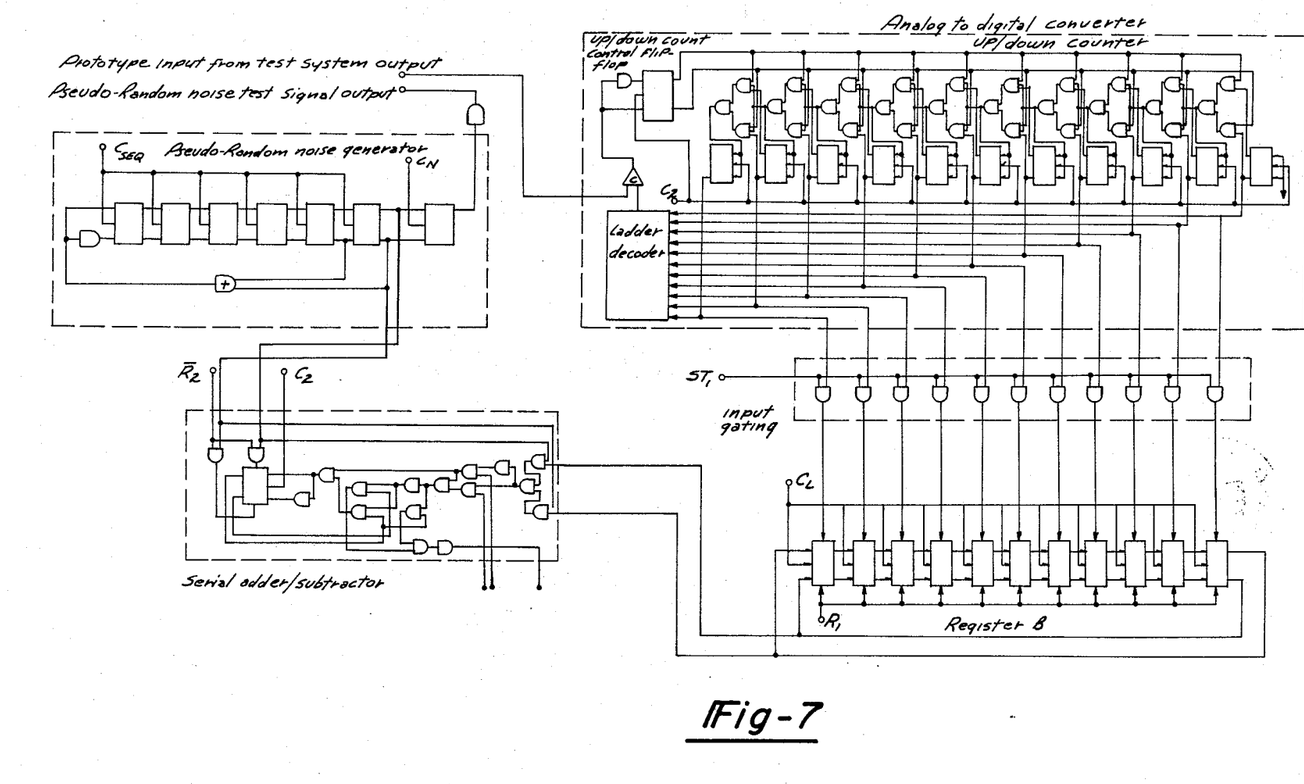
FIG. 7 is a logic diagram of the prototype sub-systems.

The memory section of the prototype consists of a 1386 bit recirculating loop (63 twenty-two bit word pairs=1386 total bits). The data flow in the loop at the basic clock rate and the basic logic gate used is a NOR gate. A 2 millisecond sonic magnetostrictive wire delay line is used as the primary storage device of the loop. The recirculating loop is closed through an external eleven bit shift register (Register A) that is used for parallel access to information in the loop. There is also a one bit external shift register immediately following the delay line output circuitry that is used to zero the contents of the delay line during the initialize mode. The shift registers are made using digital J–K flip flops as shown in FIG. 7.

Figure 8:
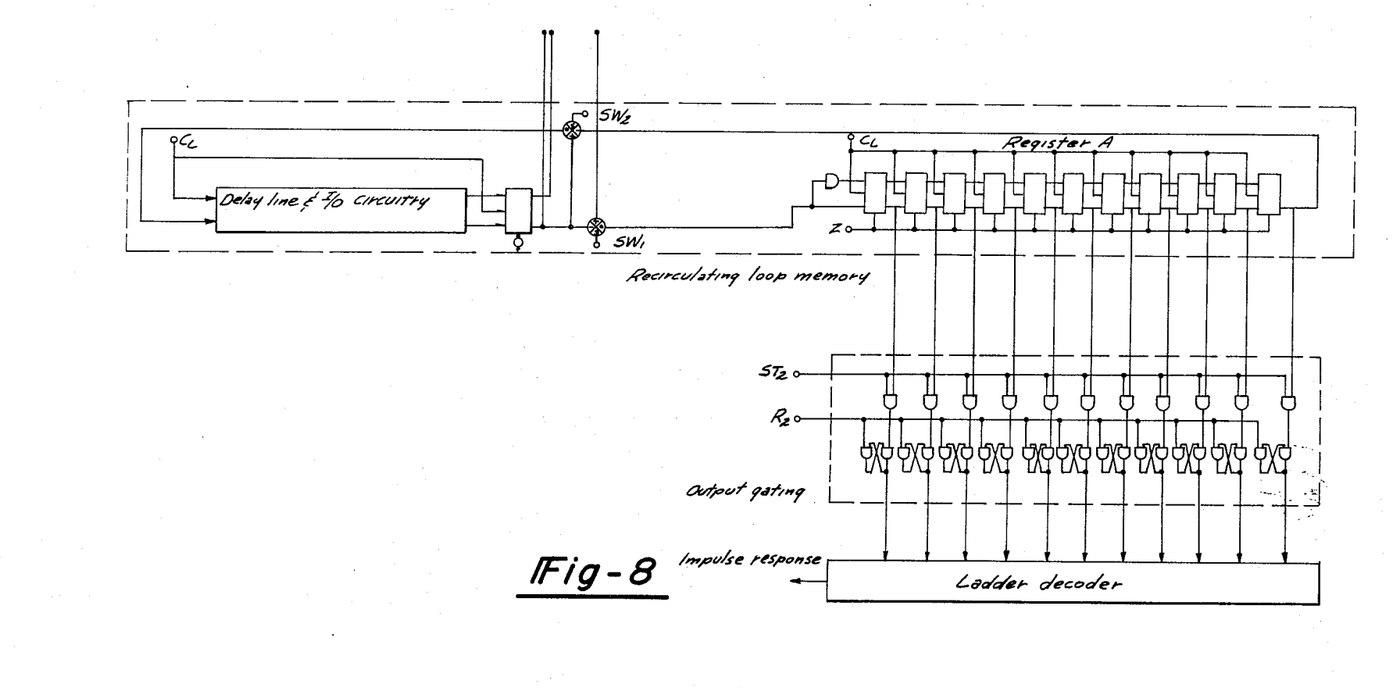
FIG. 8 is a logic diagram of prototype sub-systems.

Two serial data flow switches—are in the loop to control the calculating and shifting operations. The switch control signals come from the timing and control circuitry as shown in FIG. 8.

Two serial data flow switches are in the loop to control the calculating and shifting operations. The switch control signals come from the timing and control circuitry shown in FIG. 8.

The analog output waveform of the prototype comes from the output ladder decoder. The ladder decoder produces an output voltage proportional to the binary number applied to its input. When a value of $h'$ (in the form of an eleven bit binary number) has been shifted into Register A, timing pulses load it into the latches of the output gating circuitry. First the reset pulse $R_2$, strobed with $C_{DC1}$, resets the latches to zero. Then the pulse $ST_2$, strobed with $C_{DC2}$, sets the latches in which there is a corresponding ONE in Register A. The value of $h'$ is then held in the latches (and hence the input to the ladder decoder) for 22 clock pulses. At this time the timing pulses $R_2$ and $ST_2$ load a new value $h'$ into the output gating circuitry from Register A. In this manner a complete impulse response waveform of 63 values is displayed each recirculation.

The analog to digital converter of the prototype consists of an up/down counter, a ladder decoder and a high speed voltage comparator. The binary number in the up/down counter is converted to an analog voltage by the ladder decoder. This voltage is compared to the analog input voltage by the high speed comparator. If the output of the ladder decoder (the analog equivalent of the binary number in the up/down counter) is larger than the input voltage, the comparator output applies a down count level to the up/down count control flip-flop. On the next $C_L$ clock pulse this count control information is transferred to the counter circuitry and the counter counts down. Similarly, if the ladder decoder output is lower than the analog input, the count control flip-flop is set so that the counter will count up. The counter thus counts continuously either up or down following the analog voltage input at the basic clock rate $C_L$.

Once each recirculation the data of the eleven bit recirculating loop formed by Register B is updated from the A/D converter. First the reset pulse $R_1$, strobed with $C_{DC1}$, resets Register B to zero. Then the pulse $ST_1$, strobed with $C_{DC2}$, sets the flip-flops of Register B where there is a ONE in the corresponding bit position of the up/down counter. This sample of the test system's output, $y$, in binary form recirculates 126 times in Register B during one recirculation of the 1386 bit memory loop. Both loops are clocked at the same basic clock rate $C_L$. The values of $y$ in digital form are thus supplied to the adder/subtractor in serial form, least significant bit first.

The augend/minuend input to the serial adder/subtractor comes from the recirculating loop memory and the addend/subtrahend input comes from Register B as illustrated in FIG. 3. The sum/difference output of the adder/subtractor is fed to the + input of serial data flow switch 1. Switch 1 changes the data flow every 11 clock pulses during the calculation process as discussed earlier. This allows the stored values of $h'$ to pass unaltered from the delay line into Register A while the calculation of new values is being carried on in adjacent eleven bit words.

The add/subtract control comes from the maximum-length shift register sequence generator that produces the pseudo-random noise test signal. Every 22 $C_L$ clock pulses the shift register is clocked once by the timing pulse $C_{SEQ}$ except at the end of each recirculation of the memory loop. At that time the shifting transition is applied to the noise generator output flip-flop as $C_N$. Thus the noise sequence generator is clocked through 63 of its 64 states each recirculation of the memory loop and the output noise sequence changes once each recirculation.

Figure 9:
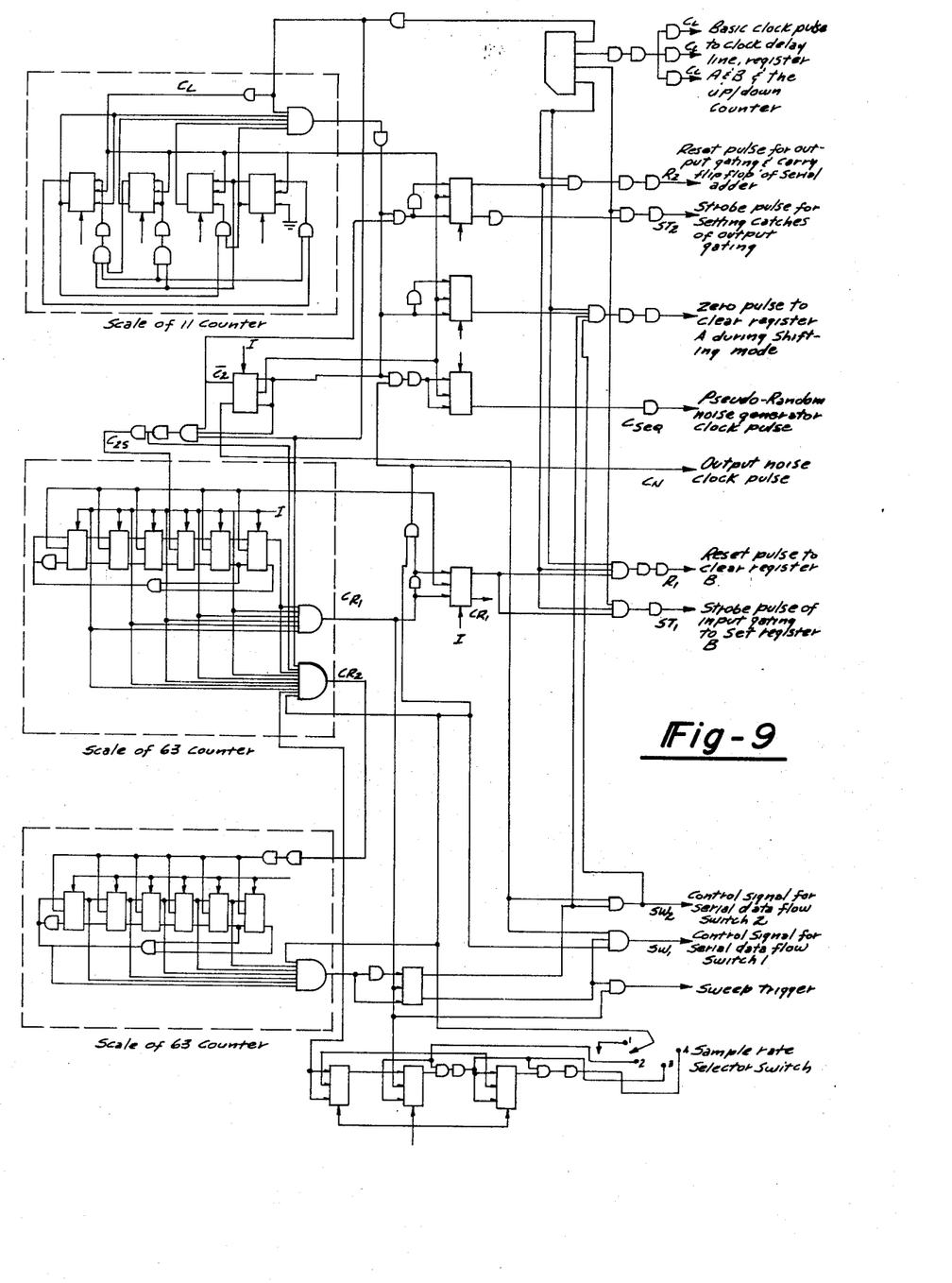
FIG. 9 is a logic diagram of the timing and control circuitry.
Figure 10:
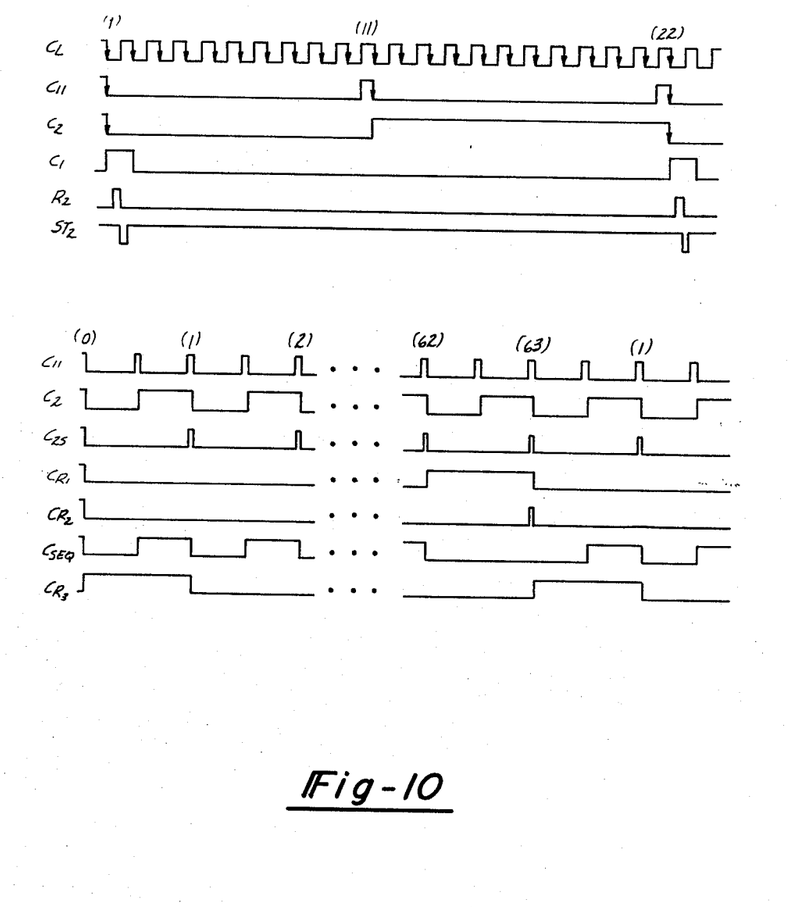
FIG. 10 is an illustration showing important timing signals used in the prototype embodiment.

The timing and control circuitry illustrated in FIG. 8, and FIG. 9, and FIG. 10 shows a timing diagram of the major control signals.

There are four counters that are at the base of the timing circuitry. A scale of 11 counter produces a pulse every 11 $C_L$ clock pulses to indicate each time a word passes a given point in the memory loop. These pulses are counted by a scale of two counter which indicates when a word pair has passed a given point in the loop. The signal from this counter is fed to a scale of 63 counter which produces a pulse each time information in the loop has made one recirculation. Finally, a second scale of 63 counter indicates the end of the cross-correlation calculation (63 recirculations of the memory loop). It is from these counter signals that the various other timing and control signals are created.

The scale of 11 binary up counter clocked by $C_L$ consists of four flip-flops. The set and reset levels of the flip-flops are generated as a function of the present state of the counter. The initialize pulse DC resets the four flip-flops to zero (the state 0000). On the first $C_L$ clock pulse the rightmost flip-flop changes state, thus the first state of the counter is 0001. The levels of the flip-flops are set according to this state of the counter and on the second clock pulse the state changes to 0010. The counter thus counts up in a binary count sequence. The set and reset levels are determined in such a way that on the eleventh clock pulse the counter returns to the zero state (0000). It is this state that is detected by a five input gate, one input from each of the counter flip-flops and a strobe input $\overline{C}_L$. The strobe input is used to keep the negative transition of the output pulse $C_{11}$ synchronized with the negative transition of $C_L$.

The pulse $\overline{C}_{11}$ is used to set the level of flip-flop 1 shown in FIG. 8. This flip-flop, clocked by $C_L$, is the scale of two counter which indicates when a 22 bit word pair has passed a given point in the memory loop. Its output $C_2$ is shown in the timing diagram of FIG. 9. By appropriately gating $\overline{C}_{11}$ and $\overline{C}_2$ and using this as an input to a one bit shift register (flip-flop 2) clocked by $C_L$, the pulse $C_1$ is formed. The timing signals $R_2$ and $ST_2$ are then formed by strobing $C_1$ with $C_{DC1}$ and $C_{DC2}$ respectively. Inverting buffers are used to give the needed drive capability.

The pulse $\overline{C}_2$, strobed with $\overline{C}_{11}$ and $\overline{C}_L$ to synchronize the negative transition with $C_L$, forms the pulse $C_{2s}$ which is used to clock the first scale of 63 counter. This counter is actually a maximum length shift register sequence generator. By using a six bit shift register with mod 2 feedback of the last two bit positions, the counter can be made to go through 63 different states before repeating. The state set by the initializing pulse is 111111. This is also the state detected by the gates to form the output pulses $C_{R1}$ and $C_{R2}$. $C_{R1}$ is positive during the entire time the counter is in the detected state. The $C_{R2}$ pulse is strobed with $C_{2s}$, $\overline{C}_{11}$ and $\overline{C}_L$ to synchronize its negative transition with $C_L$. There is also an inhibit signal input to the gate producing $C_{R2}$ which comes from the sample rate selectro switch. The $C_{R1}$ pulse is fed to a one bit shift register (flip-flop 5), clocked by $C_{2s}$, to produce the signal $C_{R3}$. The reset pulse $R_1$ used to clear Register B is then formed by ANDing $C_{R3}$, $\overline{C}_1$ and $\overline{C}_{DC1}$. Similarly, the strobe in pulse $ST_1$ used to set values of $y$ in Register B is formed by ANDing $\overline{C}_{R3}$, $\overline{C}_1$ and $\overline{C}_{DC2}$.

The second scale of 63 counter (identical in construction to the previous scale of 63 counter) is clocked by the $C_{R2}$ pulse. A gate detects the sixty-third state and this signal is shifted into a one bit shift register (flip-flop 6), clocked by $C_{R1}$. The output of this flip-flop is $C_{SH}$, the shift mode signal. This signal is one during the recirculation in which the old stored values of $h'$ are replaced by the newly calculated values.

By ANDing $\overline{C}_2$ and $\overline{C}_{SH}$, the control signal $SW_1$ is formed. This signal controls the serial data flow switch 1 and is essentially the signal $\overline{C}_2$ inhibited during the shifting mode. Similarly, the signal $SW_2$ is formed by ANDing $\overline{C}_2$ and $C_{SH}$. This signal is identical to $\overline{C}_2$ during the shifting mode but zero otherwise.

The oscilloscope sweep trigger pulse is formed using $\overline{C}_{R1}$. ANDing $\overline{C}_{SH}$ and $\overline{C}_R$ is done to eliminate the trigger pulse before the shifting recirculation.

The pseudo-random noise generator clock pulse, $C_{SEQ}$, is created in the same manner as $C_2$ except that its negative transition is inhibited once each recirculation (see FIG. 9). The $C_N$ negative transition occurs once each recirculation at the time the inhibited $C_{SEQ}$ transition would occur. $C_N$ is formed from an ANDing of $\overline{C}_{R1}$ and the signal from the sample rate selector. It is the $C_N$ signal that is used to inhibit the $C_{11}$ signal from setting the levels of flip-flop 4 once each recirculation.

The pulse Z, which clears Register A during the shifting mode, is formed by ANDing the output of flip-flop 3, $\overline{C}_{DC1}$, $\overline{C}_{SH}$ and $\overline{SW}_2$.

When the sample rate selector switch is in position 1 (grounded), the timing circuitry functions as described above and the prototype calculates an impulse response in 63 recirculations of the memory loop. When the switch is in position 2, the signal $SR_2$ inhibits the calculation process every other recirculation. Samples of $y$ are taken every other recirculation and the rate at which the noise test signal is clocked is reduced by a factor of two. It therefore takes 126 recirculations of the memory loop to calculate a set of impulse response values. In position 3 the $SR_3$ signal allows the calculator process to take place only every fourth recirculation, thus producing a set of impulse response values every 252 recirculations. With the switch in the fourth position the calculation of a set of values takes 504 recirculations.

We wish it to be understood that we do not desire to be limited to the exact details of description shown and since various changes and modifications may be made in the invention without departing from the spirit and scope of the invention as described hereinabove, and as defined in the appended claims.

What we claim is:

1. An improved method of rapidly measuring an impulse response of an on line system having an input and an output and being responsive to an input signal which provides an output signal linearly related thereto, comprising the following steps:

generating a binary pseudo-random noise sequence of length $2^n - 1 = k$ where $n$ is any positive integer;

generating from the pesudo-random noise sequence to a binary pseudo-random noise test signal compatible with the input of the on-line system;

applying the pseudo-random noise test signal to the input of the on-line system by algebraically adding the pseudo-random noise test signal to a normal on-line input signal of said on-line system;

generating for each binary digit of the pseudo-random noise sequence, and thereby for each digit of the pseudo-random noise test signal, an associated calculated pesudo-random noise sequence which comprises said pseudo-random noise sequence in reverse order and beginning with a digit for which an associated calculation sequence is being generated;

sampling the output signal of the on-line system as each digit of the pseudo-random noise test signal is applied to said on-line system;

generating $2^n - 1 = k$ values of a crosscorrelation function of the test pseudo-random noise sequence with $k$ samples of the output signal by adding each of said $k$ samples to each $k$ accumulating totals which are initially set to zero and where an output sample is added to an $i$th accumulating total if said $i$th binary digit in an associated calculation pseudo-random noise sequence corresponding to said $i$th binary digit of the pseudo-random noise test signal that is applied to the on-line system as said $k$ sample is taken, is $+1$;

generating $2^n - 1 = k$ values of a crosscorrelation function of the test pseudo-random noise sequence with $k$ samples of the output signal by subtracting each of said $k$ samples from each $k$ accumulating totals, which are initially set to zero and where an output sample is subtracted to an $i$th accumulating total if said $i$th binary digit is an associated calculation pseudo-random noise sequence corresponding to said $i$th binary digit of the pseudo-random noise test signal that is applied to the on-line system as said $k$ sample is taken, is $-1$;

generating a DC error term by summing the $k$ accumulating totals;

generating the $k$ points of the impulse response function of the on line system by subtracting the DC error term from each of $k$ accumulating totals.

2. An improved method of rapidly measuring the impulse response of an on line system as described in claim 1 wherein the binary pseudo-random noise sequence is generated by a shift register of degree $n$ with logical feedback whereby a maximal length shift register sequence of length $2^n-1$ is produced when driven by an appropriate clock shift pulse generating means.

3. An improved method of rapidly measuring the impulse response of an on line system as described in claim 2 wherein the binary pseudo-random test signal is generated as output of a one bit shift register and input being an output of said shift register of degree $n$ and driven by a clock pulse generating means.

4. An improved method of rapidly measuring the impulse response of an on line system as described in claim 3 wherein the clock shift pulse generating means delivers $2^n-2$ consecutive shift pulses to the shift register of degree $n$, one shift pulse to the one bit shift register, and continues delivering shift pulses in this ratio of $2^n-2$ to 1 until calculation of the $k$ points of the impulse response function is complete.

5. An improved method of rapidly measuring the impulse response of an on line system as described in claim 4 wherein the output signal of said on line system is converted to a digitally coded form by an analog to digital conversion means and stored in an input gating means each time the clock shift pulse generating means delivers a shift pulse to the one bit shift register.

6. An improved method of rapidly measuring the impulse response of an on line system as described in claim 5 wherein calculation of the $k$ points of crosscorrelation function is accomplished by allocating $k$ digital storage locations, initially set at zero value, in a data storage means in such manner that they are presented sequentially by a timing means to an adder/subtractor means whereby contents of the input register are added to contents of each said storage locations when output of the shift register of degree $n$ is a $+1$ and where said timing means is coherent with the shift pulse delivered to said shift register of degree $n$.

7. An improved method of rapidly measuring the impulse response of an on line system as described in claim 6 wherein calculation of the $k$ points of the crosscorrelation function is accomplished by allocating $k$ digital storage locations, initially set at zero value, in a data storage means so as to be presented sequentially by a timing means to an adder/subtractor means whereby contents of the input register are subtracted from contents of each of the storage locations when the output of the shift register of degree $n$ is a $-1$ and where said timing means is coherent with the shift pulse delivered to the shift register of degree $n$.

8. An improved method of rapidly measuring the impulse response of an on line system as in claim 7 wherein the DC error term is formed by presenting with a timing means the contents of the $k$ digital storage locations to an added means whereby said contents of said $k$ digital storage locations are summed algebraically and stored in a data register.

9. An improved method of rapidly measuring the impulse response of an on line system as described in claim 8 wherein the contents of the digital storage locations are presented by a timing means to a subtractor means whereby the DC error terms stored in the data register are algebraically subtracted from the contents of each of the digital storage locations.

References Cited

UNITED STATES PATENTS

| | | | |
|---|---|---|---|
| 3,354,297 | 11/1967 | Anderson et al. | 235—181 |
| 3,586,846 | 6/1971 | Ley | 235—181 |

OTHER REFERENCES

Briggs et al. Correlation Analysis of Process using Pseudo-Random binary Test Perturbations.

Proceedings of the Institute of Mechanical Engineers, 1964–1965, vol. 179, part 3H, pp. 37–51.

FELIX D. GRUBER, Primary Examiner

U.S. Cl. X.R.

178—69 A; 235—150.53, 151.3, 156; 324—57 PS, 77 G; 325—67